US009532324B2

(12) United States Patent
Ukita et al.

(10) Patent No.: US 9,532,324 B2
(45) Date of Patent: Dec. 27, 2016

(54) COMMUNICATION DEVICE AND METHOD OF DETERMINING COMMUNICATION METHOD

(71) Applicant: Panasonic Intellectual Property Management Co., Ltd., Osaka (JP)

(72) Inventors: Yosuke Ukita, Osaka (JP); Hiroshi Hayashino, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 97 days.

(21) Appl. No.: 14/398,988

(22) PCT Filed: Feb. 21, 2014

(86) PCT No.: PCT/JP2014/000933
§ 371 (c)(1),
(2) Date: Nov. 5, 2014

(87) PCT Pub. No.: WO2014/136397
PCT Pub. Date: Sep. 12, 2014

(65) Prior Publication Data
US 2015/0124798 A1    May 7, 2015

(30) Foreign Application Priority Data
Mar. 7, 2013    (JP) .................................. 2013-045370

(51) Int. Cl.
*H04W 56/00*    (2009.01)
*H04W 48/16*    (2009.01)
(52) U.S. Cl.
CPC ......... *H04W 56/0015* (2013.01); *H04W 48/16* (2013.01)

(58) Field of Classification Search
CPC . H04W 56/00; H04W 56/0045; H04B 7/2662; H04J 2011/0096
See application file for complete search history.

(56) References Cited

U.S. PATENT DOCUMENTS 4,281,412 A * 7/1981 Wissel .................. H04L 7/0332
329/310
5,555,024 A * 9/1996 Limberg ................ H04H 20/31
348/473

(Continued)

FOREIGN PATENT DOCUMENTS

JP    11-017770    1/1999
JP    2008-010904    1/2008

(Continued)

OTHER PUBLICATIONS

International Search Report issued Apr. 22, 2014 in International (PCT) Application No. PCT/JP2014/000933.

*Primary Examiner* — Michael J Moore, Jr.
*Assistant Examiner* — Prenell Jones
(74) *Attorney, Agent, or Firm* — Wenderoth, Lind & Ponack, L.L.P.

(57) ABSTRACT

A communication device and a communication scheme judgment method that enable reception of frames of different communication schemes without setting a common synchronization signal in the frames for each communication scheme. A signal including synchronization information corresponding to a communication scheme is receivable via a frequency band within which a frequency band of a channel corresponding to a first communication scheme overlaps with at least a portion of a frequency band of a channel corresponding to a second communication scheme. Using the synchronization information, when synchronization of one communication scheme out of the first communication scheme and the second communication scheme is (Continued)

establishable, processing of the signal is performed using the one communication scheme, and when the synchronization of the one communication scheme is not establishable and synchronization of the other communication scheme is establishable, processing of the signal is performed using the other communication scheme.

14 Claims, 16 Drawing Sheets

(56) References Cited

U.S. PATENT DOCUMENTS

| | | | | |
|---|---|---|---|---|
| 5,805,633 A * | 9/1998 | Uddenfeldt | | H04W 16/02 370/330 |
| 5,805,979 A * | 9/1998 | Miyashita | | H04W 52/0229 340/7.43 |
| 6,266,385 B1 * | 7/2001 | Roy | | H04J 3/0605 365/189.12 |
| 6,493,725 B1 * | 12/2002 | Iwai | | G06F 17/30581 |
| 6,542,563 B1 * | 4/2003 | Shoji | | H04L 7/042 370/510 |
| 6,744,893 B1 * | 6/2004 | Fleming-Dahl | | H04L 27/001 380/263 |
| 8,374,291 B1 * | 2/2013 | Himsoon | | H04L 27/22 375/340 |
| 2002/0065060 A1 * | 5/2002 | Minnis | | H04B 1/406 455/324 |
| 2004/0028123 A1 * | 2/2004 | Sugar | | H04L 1/1664 375/224 |
| 2004/0057529 A1 * | 3/2004 | Koga | | H04L 27/2602 375/260 |
| 2004/0174845 A1 * | 9/2004 | Koo | | H04W 36/0055 370/328 |
| 2005/0075125 A1 * | 4/2005 | Bada | | H04W 48/20 455/525 |
| 2005/0163273 A1 * | 7/2005 | Scheffel | | H04J 3/0658 375/354 |
| 2006/0098544 A1 * | 5/2006 | Oki | | G11B 20/1403 369/47.28 |
| 2007/0002725 A1 * | 1/2007 | Nystrom | | H04L 27/30 370/208 |
| 2007/0280363 A1 * | 12/2007 | Im | | H04L 25/0212 375/260 |
| 2008/0109711 A1 | 5/2008 | Morioka et al. | | |
| 2008/0279287 A1 * | 11/2008 | Asahina | | H04B 1/69 375/242 |
| 2009/0202025 A1 * | 8/2009 | Majima | | H04W 56/0085 375/354 |
| 2010/0173594 A1 * | 7/2010 | Stettler | | H04B 1/715 455/77 |
| 2011/0092160 A1 * | 4/2011 | Camp, Jr. | | H04B 1/69 455/41.3 |
| 2011/0211570 A1 * | 9/2011 | Heinrich | | H04W 56/00 370/350 |
| 2011/0317679 A1 | 12/2011 | Jain | | |
| 2012/0207195 A1 * | 8/2012 | Kawasaki | | H04B 1/04 375/219 |
| 2013/0272450 A1 * | 10/2013 | Takeuchi | | H04L 27/32 375/308 |
| 2013/0279429 A1 * | 10/2013 | Magne | | H04H 20/42 370/329 |
| 2014/0080468 A1 * | 3/2014 | Zhang | | H04W 24/02 455/418 |

FOREIGN PATENT DOCUMENTS

| | | |
|---|---|---|
| JP | 2010-098612 | 4/2010 |
| JP | 4697068 | 6/2011 |

* cited by examiner

| Communication scheme | Bit-rate (kbps) | Center frequency (MHz) | Bandwidth (kHz) |
|---|---|---|---|
| A | 50 | 924.0 | 200 |
| B | 100 | 924.1 | 400 |

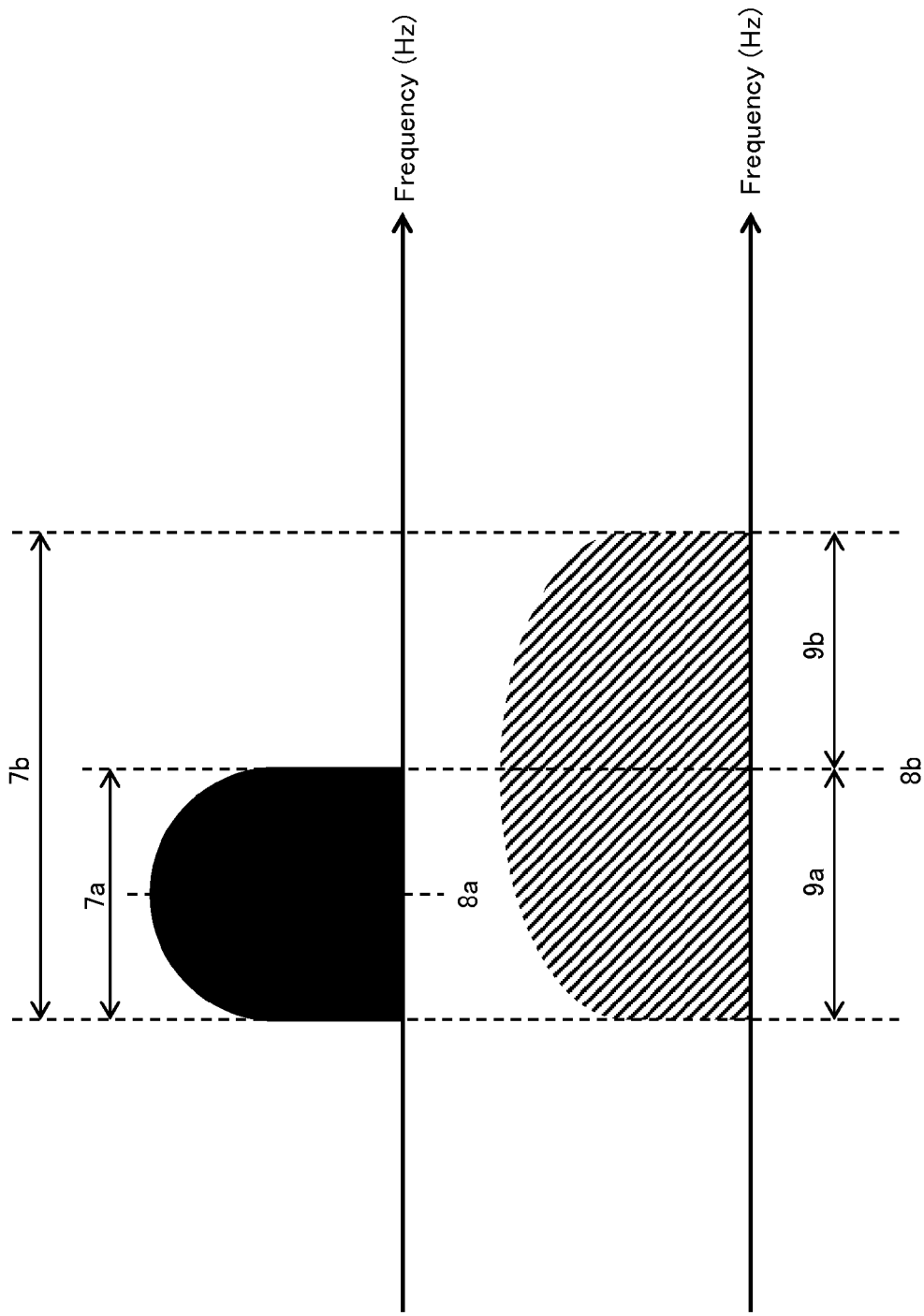

| Channel selection pattern | Channel of communication scheme A | Channel of communication scheme B |
|---|---|---|
| 1 | Ch1 | Ch11 |
| 2 | Ch3 | Ch12 |
| 3 | Ch5 | Ch13 |

COMMUNICATION DEVICE AND METHOD OF DETERMINING COMMUNICATION METHOD

TECHNICAL FIELD

The present invention relates to communication devices and communication scheme judgment methods that determine a communication scheme of receive data in cases in which the communication devices receive data of different communication schemes in a communication network.

BACKGROUND ART

A wireless communication network represented by the Institute of Electrical and Electronics Engineers (IEEE) standard 802.11 or 802.15.4 typically includes a wireless communication device as an access point (hereafter, "control device") and a plurality of wireless communication devices as stations (hereafter, "terminal devices").

In such a wireless communication network, for example, in home network use, a network may be posited in which a communication scheme of an 802.11 standard and a communication scheme of an 802.15.4 standard coexist. For example, a computer and an audio-visual (AV) device such as a television communicate by using the 802.11 standard, and major appliances such as an air conditioner and refrigerator communicate by using the 802.15.4 standard. Further, other wireless networks may be posited in which an older communication scheme of a previously-released product coexists with a new communication scheme of a latest-model product.

In such wireless networks it is preferable from a cost, operation, and maintenance perspective that the number of installed control devices does not increase in proportion to the number of communication schemes, but that, as illustrated in FIG. 15, a single installed control device supports all communication schemes.

However, because a control device 208 does not know when a frame will be transmitted from a terminal device 202a, 202b of a communication scheme A or a terminal device 209a, 209b of a communication scheme B, the control device 208 is required to be constantly, simultaneously, on standby to receive data of different communication schemes.

To solve such a problem, Patent Literature 1 discloses technology which uses shared synchronization signals to receive data of difference communication schemes.

FIG. 16 is a diagram of a network in which a control device 225 communicates with a terminal device 226a using the communication scheme A and communicates with a terminal device 226b using the communication scheme B. A frame transmitted by the terminal device 226a includes a synchronization signal 1, a header 1, and a payload 1, while a frame transmitted by the terminal device 226b includes the synchronization signal 1, the header 1, a synchronization signal 2, a header 2, and a payload 2. Here, for example, a synchronization signal is a physical layer convergence protocol (PLCP) preamble, a header is a PLCP header, and a payload is a PLCP service data unit (PSDU).

Frames transmitted by the terminal device 226b always have the synchronization signal 1 and the header 1 of the communication scheme A attached to a head frame thereof. In other words, according to the technology disclosed in Patent Literature 1, although communication schemes are different, frames have the synchronization signal 1 and the header 1 in common. The header 1 includes information regarding data that follows the header 1. Thus, the control device 225 is constantly on standby to receive a signal of data of the communication scheme A, and performs synchronization judgment using the synchronization signal 1 of receive data. Then, by analyzing the header 1 corresponding to the communication scheme A, the control device 225 is able to judge whether receive data is of the communication scheme A or the communication scheme B.

CITATION LIST

Patent Literature

[Patent Literature 1]
  Japanese Patent No. 4697068

SUMMARY OF INVENTION

According to the above-described conventional technology, in cases in which communication schemes of receive data differs, the control device 225 is able to be simultaneously on standby to receive frames of different communication schemes when a received frame includes the common synchronization signal, but is unable to be simultaneously on standby to receive frames of different communication schemes when the frames do not include the common synchronization signal. This is a limitation in achieving coexistence of a wide variety of communication schemes.

Thus, the present invention provides a communication device and a communication scheme judgment method that enables reception of frames of different communication schemes without setting a common synchronization signal in the frames for each communication scheme.

A communication device pertaining to one aspect of the present invention is a communication device that receives, via a communication network, a plurality of signals each corresponding to one of a first communication scheme and a second communication scheme, wherein each signal of the plurality of signals includes synchronization information corresponding to one of the first communication scheme and the second communication scheme, the communication device comprising: a receiver configured to receive the plurality of signals via a frequency band within which at least a portion of a frequency band of a channel corresponding to the first communication scheme overlaps with at least a portion of a frequency band of a channel corresponding to the second communication scheme; a synchronization judgment unit that judges whether or not synchronization of a signal received by the receiver is establishable, by using the synchronization information included in the signal received by the receiver; and a scheme judgment unit that, when synchronization of one communication scheme out of the first communication scheme and the second communication scheme is establishable using the synchronization information, performs reception processing of the signal using the one communication scheme, and when the synchronization of the one communication scheme is not establishable and synchronization of the other communication scheme is establishable using the synchronization information, performs reception processing of the signal using the other communication scheme.

According to this aspect of the present invention, reception of frames of different communication schemes is possible by using synchronization signals corresponding to each communication scheme, without setting a common synchronization signal in the frames for each communication scheme. Thus, an amount of data in a header of a frame is reduced.

BRIEF DESCRIPTION OF DRAWINGS

FIG. 3 is a diagram illustrating spectrum signals of the communication scheme A and the communication scheme B in embodiment 1.

Figure 1:
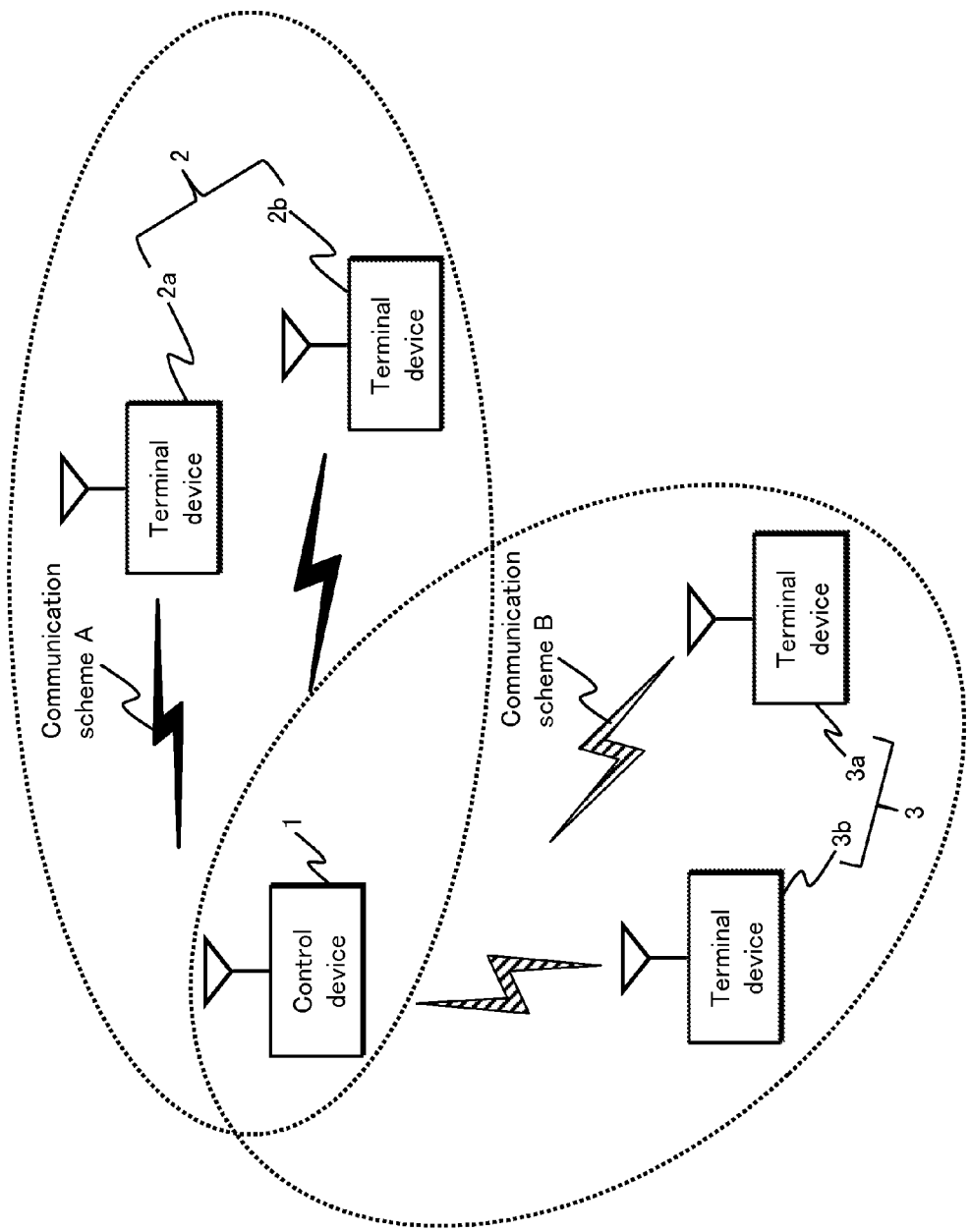
FIG. 1 is a diagram illustrating one example of a network configuration in embodiment 1.

DESCRIPTION OF EMBODIMENTS (1) A communication device pertaining to an embodiment is a communication device that receives, via a communication network, a plurality of signals each corresponding to one of a first communication scheme and a second communication scheme, wherein each signal of the plurality of signals includes synchronization information corresponding to one of the first communication scheme and the second communication scheme, the communication device comprising: a receiver configured to receive the plurality of signals via a frequency band within which at least a portion of a frequency band of a channel corresponding to the first communication scheme overlaps with at least a portion of a frequency band of a channel corresponding to the second communication scheme; a synchronization judgment unit that judges whether or not synchronization of a signal received by the receiver is establishable, by using the synchronization information included in the signal received by the receiver; and a scheme judgment unit that, when synchronization of one communication scheme out of the first communication scheme and the second communication scheme is establishable using the synchronization information, performs reception processing of the signal using the one communication scheme, and when the synchronization of the one communication scheme is not establishable and synchronization of the other communication scheme is establishable using the synchronization information, performs reception processing of the signal using the other communication scheme.

(2) In the communication device of (1), when the frequency band of the channel corresponding to the first communication scheme is included within the frequency band of the channel corresponding to the second communication scheme, the synchronization judgment unit, after judging whether or not synchronization of the first communication scheme is establishable and upon judging that synchronization is not establishable, may judge whether or not synchronization of the second communication scheme is establishable.

(3) In the communication device of (1) or (2), the synchronization judgment unit may perform judgment by using a center frequency corresponding to the first communication scheme and a center frequency corresponding to the second communication scheme.

(4) In the communication devices of (1)-(3), each signal to be received by the receiver may further include a data payload, and the scheme judgment unit, when synchronization of the signal to be received is established at a frequency corresponding to one of the first communication scheme and the second communication scheme, may perform reception processing of the data payload included in the signal.

(5) In the communication device of any one of (1)-(4), the scheme judgment unit, when synchronization of the signal is not established at a center frequency corresponding to the second communication scheme, may cease reception processing of the signal.

(6) In the communication device of any one of (1)-(5), the synchronization information may include bit synchronization information and frame synchronization information, and the synchronization judgment unit may perform bit synchronization judgment using the bit synchronization information and subsequently perform frame synchronization judgment using the frame synchronization information, and, when both bit synchronization and frame synchronization are established, may judge that synchronization of the signal is established.

(7) In the communication device of any one of (1)-(6), a channel control unit, in response to a change in a channel corresponding to either the first communication scheme or the second communication scheme, may change a channel corresponding to the other one of the first communication scheme and the second communication scheme, and may change frequency bands of the channels corresponding to the first communication scheme and the second communication scheme after the change such that at least a portion of the frequency band of the channel corresponding to the first communication scheme overlaps with at least a portion of the frequency band of the channel corresponding to the second communication scheme.

(8) In the communication device of (7), a channel list storage unit may store a channel list of combinations of channels of each communication scheme such that at least a portion of the frequency band of the channel corresponding to the first communication scheme overlaps with at least a portion of the frequency band of the channel corresponding to the second communication scheme, wherein the channel control unit may change the channel by referencing the channel list storage unit.

(9) In the communication device of any one of (1) to (8), a transmission bandwidth of the second communication scheme may be an integer multiple of a transmission bandwidth of the first communication scheme.

(10) In the communication device of (9), the transmission bandwidth of the first communication scheme may be 200 kHz and the transmission bandwidth of the second communication scheme may be 400 kHz.

(11) In the communication device of any one of (1) to (10), the communication network may be a wireless communication network.

(12) A signal reception method pertaining to an aspect of the present invention is a signal reception method of a communication device that receives, via a communication network, a plurality of signals corresponding to different communication schemes, wherein each signal of the plurality of signals includes synchronization information corresponding to one of the different communication schemes, the signal reception method comprising: receiving the plurality of signals via a frequency band within which at least a portion of a frequency band of a channel corresponding to a first communication scheme overlaps with at least a portion of a frequency band of a channel corresponding to a second communication scheme; judging whether or not synchronization of a signal received by the receiver is establishable, by using the synchronization information included in the signal received by the receiver; and when synchronization of one communication scheme out of the first communication scheme and the second communication scheme is establishable using the synchronization information, performing reception processing of the signal using the one communication scheme, and when the synchronization of the one communication scheme is not establishable and synchronization of the other communication scheme is establishable using the synchronization information, performing reception processing of the signal using the other communication scheme.

(13) An integrated circuit pertaining to an aspect of the present invention is an integrated circuit mounted on a communication device that receives, via a communication network, a plurality of signals each corresponding to one of a first communication scheme and a second communication scheme, wherein each signal of the plurality of signals includes synchronization information corresponding to one of the first communication scheme and the second communication scheme, the integrated circuit comprising: a receiver configured to receive the plurality of signals via a frequency band within which at least a portion of a frequency band of a channel corresponding to the first communication scheme overlaps with at least a portion of a frequency band of a channel corresponding to the second communication scheme; a synchronization judgment unit that judges whether or not synchronization of a signal received by the receiver is establishable, by using the synchronization information included in the signal received by the receiver; and a scheme judgment unit that, when synchronization of one communication scheme out of the first communication scheme and the second communication scheme is establishable using the synchronization information, performs reception processing of the signal using the one communication scheme, and when the synchronization of the one communication scheme is not establishable and synchronization of the other communication scheme is establishable using the synchronization information, performs reception processing of the signal using the other communication scheme.

(14) A program pertaining to an aspect of the present invention is a program that causes a computer to execute signal reception processing, the program being executed by a communication device that receives, via a communication network, a plurality of signals corresponding to different communication schemes, wherein each signal of the plurality of signals includes synchronization information corresponding to one of the different communication schemes, the signal reception processing comprising: receiving the plurality of signals via a frequency band within which at least a portion of a frequency band of a channel corresponding to a first communication scheme overlaps with at least a portion of a frequency band of a channel corresponding to a second communication scheme; judging whether or not synchronization of a signal received by the receiver is establishable, by using the synchronization information included in the signal received by the receiver; and when synchronization of one communication scheme out of the first communication scheme and the second communication scheme is establishable using the synchronization information, performing reception processing of the signal using the one communication scheme, and when the synchronization of the one communication scheme is not establishable and synchronization of the other communication scheme is establishable using the synchronization information, performing reception processing of the signal using the other communication scheme.

Each embodiment of the present invention is described below with reference to the drawings.

Embodiment 1

FIG. 1 is a diagram illustrating a configuration example of a wireless communication network in embodiment 1 of the present invention. In FIG. 1, a control device 1 communicates with terminal devices 2 and terminal devices 3 using different communication schemes. The control device 1 communicates with a terminal device 2a and a terminal device 2b using a communication scheme A. Further, the control device 1 communicates with a terminal device 3a and a terminal device 3b using a communication scheme B.

The terminal devices 2 and the terminal devices 3 are, for example, household electronics such as a refrigerator, television, etc., heat source devices such as an IH cooking heater, or electrically-driven devices such as an electric car. Note that the number depicted of the terminal devices 2 and terminal devices 3 communicating with the control device 1 in FIG. 1 is just an example, and the present invention is not limited in this way.

Figures 2A, 2B:
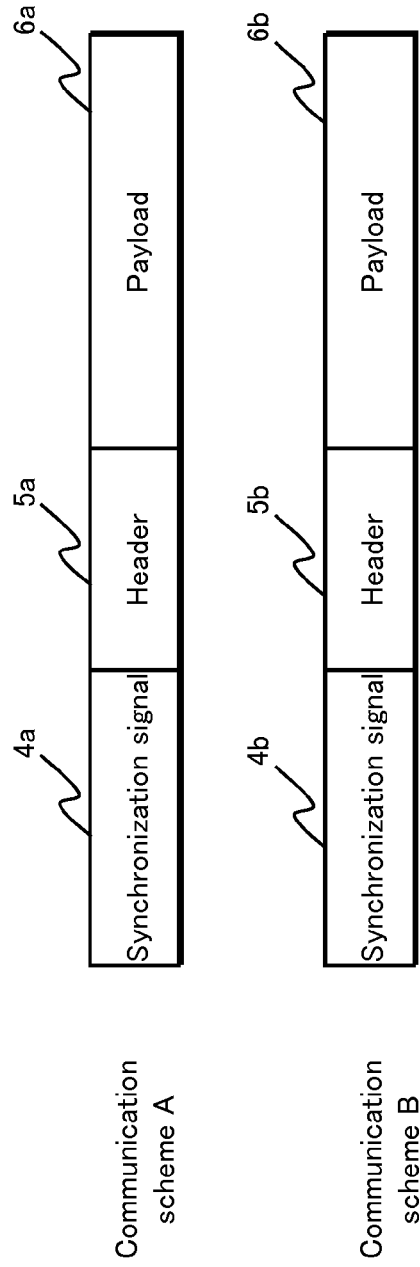
FIG. 2A is a table illustrating one example of parameters of a communication scheme A and a communication scheme B in embodiment 1.
FIG. 2B is a diagram illustrating examples of frame configuration.

FIG. 2A and FIG. 2B are examples of use of the communication scheme A and the communication scheme B in embodiment 1. In FIG. 2A, the communication scheme A has a bit-rate of 50 kbps, a center frequency of 924.0 MHz, and a bandwidth (or transmission bandwidth) of 200 kHz. The communication scheme B has a bit-rate of 100 kbps, a center frequency of 924.1 MHz, and a bandwidth of 400 kHz. However, these three conditions illustrate example conditions, and there may be other conditions such as different modulation schemes, differences corresponding to data whitening, etc.

FIG. 2B is one example of frame configurations of the communication scheme A and the communication scheme B.

The frame of the communication scheme A includes a synchronization signal 4a, a header 5a, and a payload 6a. The frame of the communication scheme B includes a synchronization signal 4b, a header 5b, and a payload 6b.

Further, the synchronization signal 4a and the synchronization signal 4b have different bit patterns. Note that the synchronization signal 4a and the synchronization signal 4b may have the same bit pattern.

Here, for example, a synchronization signal is a preamble signal, a start of frame delimiter (SFD), or a synchronization word, a header is a physical layer header (PHR), and a payload is a PSDU.

FIG. 3 illustrates spectrum signals of the communication scheme A and the communication scheme B in embodiment 1, expressed along a frequency axis. In FIG. 3, a unit channel of the communication scheme A is defined as 7a and a unit channel of the communication scheme B is defined as 7b.

As illustrated in FIG. 3, in embodiment 1, a frequency band of the communication scheme A and a frequency band of the communication scheme B exist in overlapping frequencies. A center frequency of the communication scheme A is a frequency 8a in FIG. 3, and a center frequency of the communication scheme B is a frequency 8b in FIG. 3. Further, a frequency band that overlaps is defined as an overlapping frequency band 9a and a frequency band that does not overlap is defined as a non-overlapping frequency band 9b. Note that frequency bands of each communication scheme are defined as overlapping in advance by an operational system.

Figure 4:
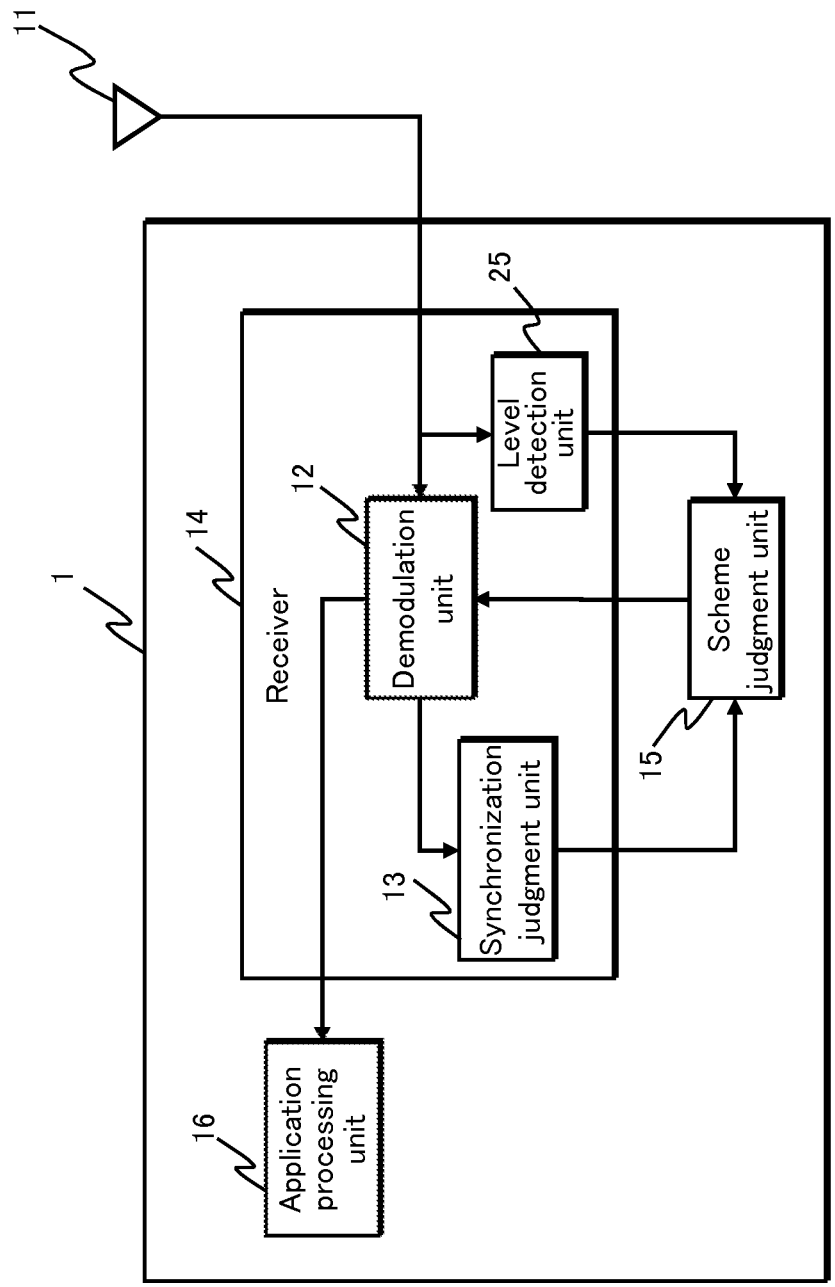
FIG. 4 is a block diagram illustrating a configuration of a control device in embodiment 1.

FIG. 4 is a diagram illustrating an example of function blocks of the control device 1 in embodiment 1. The control device 1 includes an antenna 11, a receiver 14, a scheme judgment unit 15, and an application processing unit 16. The control device 1 wirelessly communicates with the terminal devices 2 and the terminal devices 3 via the antenna 11.

The receiver 14 includes a demodulation unit 12, a level detection unit 25, and a synchronization judgment unit 13.

The demodulation unit 12 demodulates data received via the antenna 11.

The level detection unit 25 has a function of measuring signal strength of receive data and a function of making a threshold value judgment of signal strength thus measured. Clear channel assessment (CCA), carrier sense (CS), energy detect (ED), etc., are examples of a function of the level detection unit 25.

The synchronization judgment unit 13 detects a bit pattern of a received signal, and establishes synchronization. Note that establishing synchronisation may, for example, be detecting a beginning of data.

Note that a specific method of synchronization establishment may be bit synchronization establishing synchronization per bit unit, or frame synchronization establishing synchronization per predefined frame synchronization pattern. Further, use of a combination of bit synchronization and frame synchronization is possible.

Further, the receiver 14, may have a function of setting a bit-rate, a function of setting a frequency, etc., in addition to the demodulation unit 12, the synchronization judgment unit 13, and the level detection unit 25. Functions of a physical layer of IEEE 802.15.4 or other wireless communication systems are examples of the receiver 14.

The scheme judgment unit 15, using a function of the synchronization judgment unit 13, judges whether data received by the receiver 14 is of the communication scheme A or the communication scheme B. A detailed description of the scheme judgment unit 15 is provided later using the flowchart of FIG. 9.

The application processing unit 16 executes application processing of data received by the receiver 14. Application processing is processing that analyzes data content transmitted from each terminal device, for example, analysis of a media access control (MAC) header, a MAC payload, etc.

Figure 5:
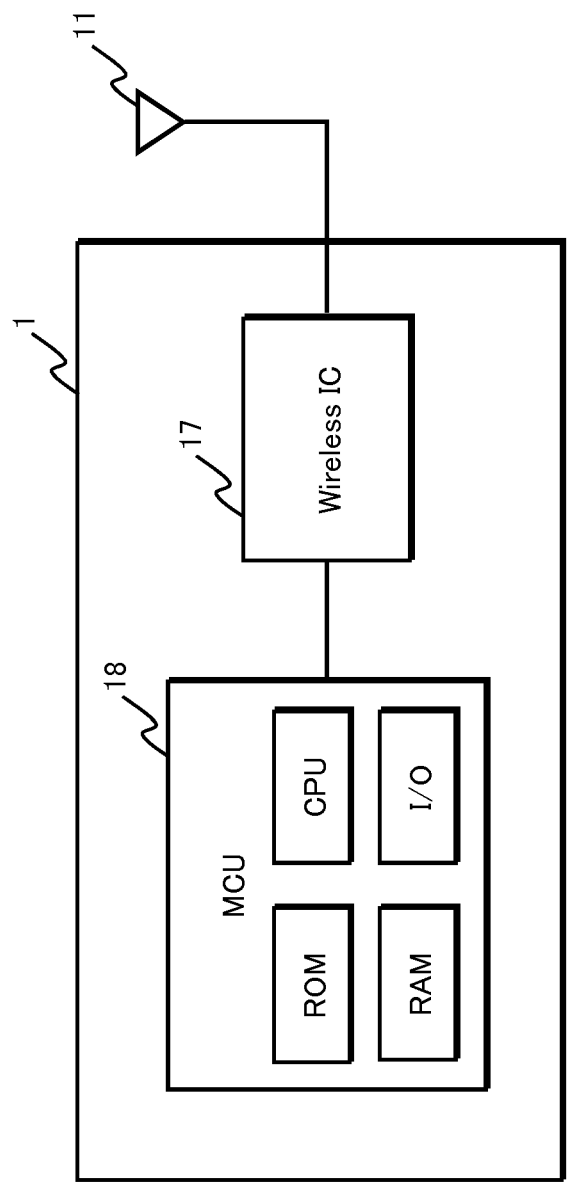
FIG. 5 is a diagram illustrating one example of a hardware configuration of the control device in embodiment 1.

FIG. 5 is a diagram illustrating one example of a hardware configuration of the control device 1 in embodiment 1.

A wireless IC 17 is an integrated circuit that performs function such as modulation and demodulation of wireless communication.

An MCU 18 is a microprocessor that is an integrated circuit provided with an I/O port as an external interface and internally a CPU core, memory such as ROM, RAM, etc.

Note that the scheme judgment unit 15 and the application processing unit 16 in FIG. 4 are implemented in the MCU 18 in FIG. 5. The receiver 14 is implemented in the wireless IC 17. Note that the level detection unit 25 may also be implemented in the MCU 18.

Figure 6:
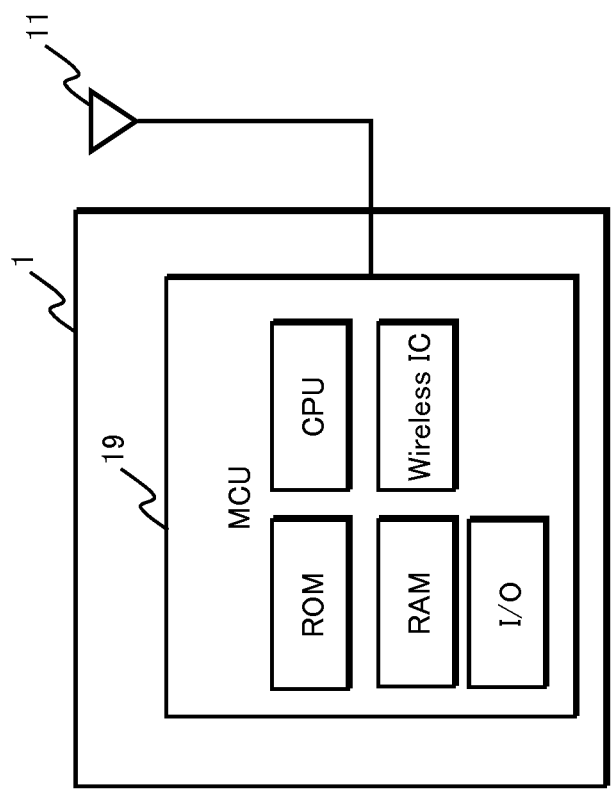
FIG. 6 is a diagram illustrating one example of a hardware configuration of the control device in embodiment 1.

Note that, as illustrated in FIG. 6, the wireless IC 17 and the MCU 18 may be implemented as a single integrated circuit (MCU 19).

Above is description of the network configuration and configuration of the control device 1 pertaining to embodiment 1.

The following describes operations of the control device 1 pertaining to embodiment 1.

Figure 7:
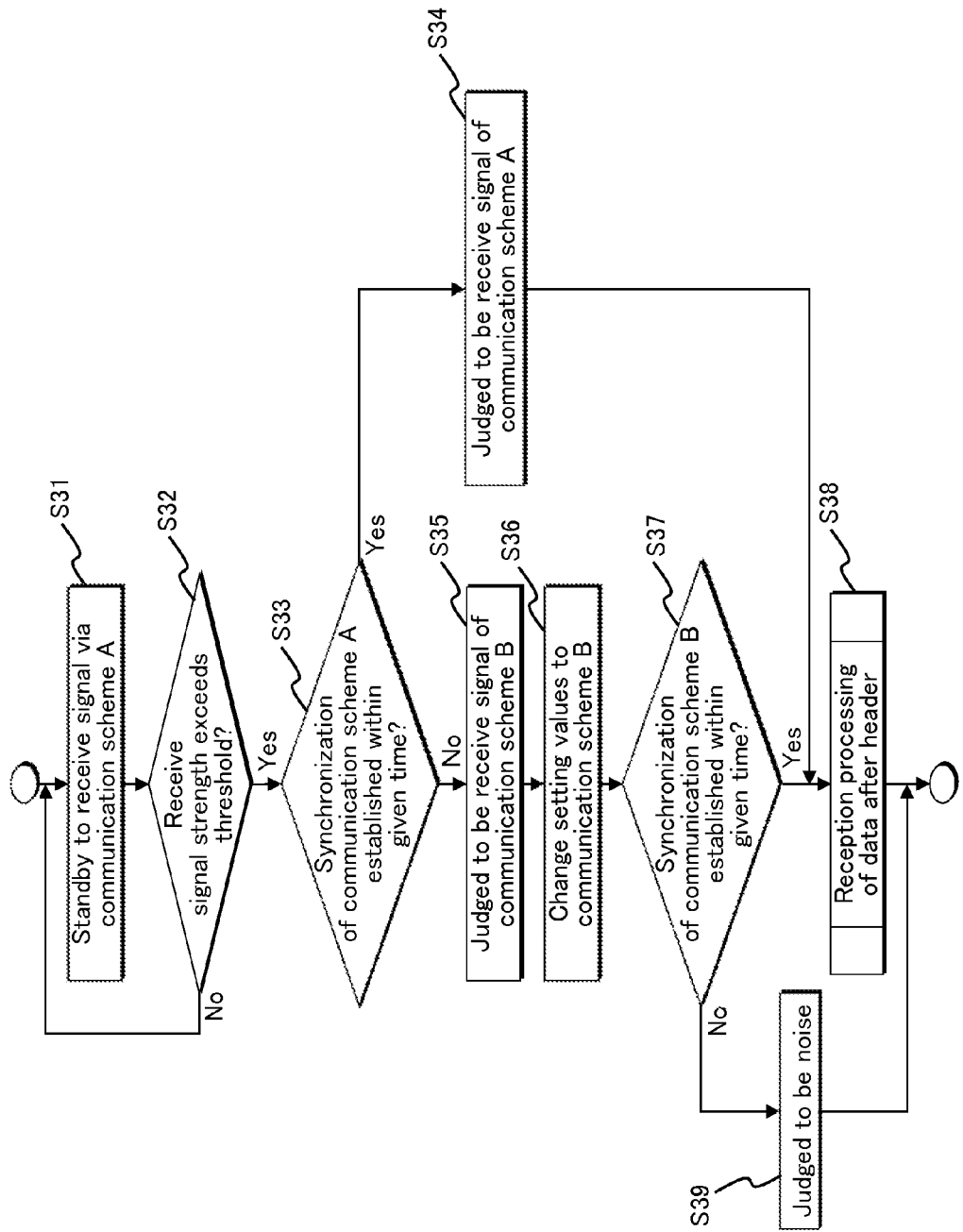
FIG. 7 is a flowchart illustrating flow of an operation in embodiment 1.

FIG. 7 is a flowchart illustrating a communication scheme judgment method when the control device 1 in embodiment 1 receives data from the terminal devices 2 and the terminal devices 3.

First, the control device 1 is constantly on standby to receive a signal at a center frequency (the frequency 8a in FIG. 3) of the communication scheme A (S31). Further, the level detection unit 25 constantly checks whether or not a signal strength of receive data exceeds a predefined threshold (S32).

In S32, when the signal strength of the receive data exceeds the threshold ("Yes" at S32), the synchronization judgment unit 13 performs, within a given period, synchronization judgment based on the communication scheme A. In other words, the synchronization judgment unit 13 judges whether or not a bit pattern of the synchronization signal 4a can be detected, based on the communication scheme A (S33).

In S33, when synchronization is established ("Yes" at S33), i.e., when a bit pattern of the synchronization signal 4a is detected, the scheme judgment unit 15 judges that a communication scheme of the receive data is the communication scheme A (S34).

Subsequently, the control device 1 performs reception processing such as analysis of the header 5a and the payload 6a as following data in the communication scheme A (S38).

On the other hand, in S33, when synchronization is not established by synchronization judgment within a given time ("No" at S33), the scheme judgment unit 15 judges that the communication scheme of the receive data is the communication scheme B (S35).

Subsequently, the scheme judgment unit 15 sets the receiver 14 to setting values of the communication scheme B such as a bit-rate and a center frequency (the frequency 8b in FIG. 3) thereof.

Next, the synchronization judgment unit 13 performs synchronization judgment based on the communication scheme B, within a given time. In other words, the synchronization judgment unit 13 judges whether or not a bit pattern of the synchronization signal 4b is detected, based on the communication scheme B (S37).

In S37, when synchronization is established ("Yes" at S37), i.e., when a bit pattern of the synchronization signal 4b is detected, the control device 1 performs reception processing such as analysis of the header 5b and the payload 6b as following data in the communication scheme B (S38).

On the other hand, in S37, when synchronization is not established by synchronization judgment in a given time ("No" at S37), the scheme judgment unit 15 judges that the receive data neither corresponds to the communication scheme A nor the communication scheme B (for example, judges that the receive data is noise), and ceases reception of the data (S39).

According to embodiment 1, the control device 1 is on standby to receive data based on the communication scheme A (a scheme using a narrow frequency band) and detects a beginning of receive data of an unidentified communication scheme based on a signal strength of the receive data. Subsequently, the control device 1 performs synchronization judgment of each of the communication scheme A and the communication scheme B, and determines a communication scheme of the receive data.

In this way, reception of frames of different communication schemes is possible by using synchronization signals corresponding to each communication scheme, without setting a common synchronization signal in the frames for each communication scheme. Thus, an amount of data in a header of a frame is reduced. As a result, transmission time of a frame is reduced, and usage efficiency of a wireless frequency is increased.

[Modification]

Next, a modification of embodiment 1 of the present invention is described.

Figure 8:
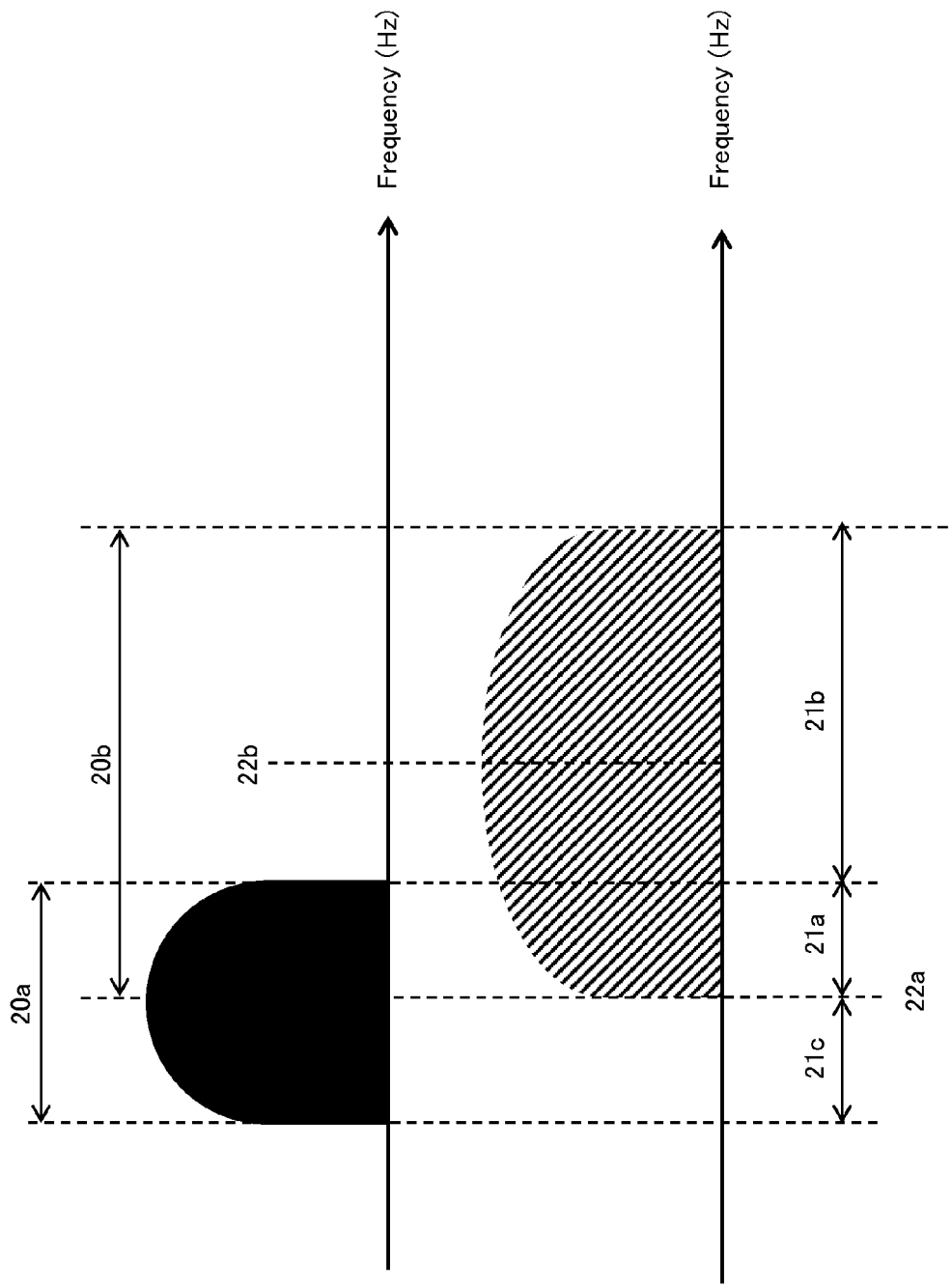
FIG. 8 is a diagram illustrating spectrum signals of the communication scheme A and the communication scheme B in modification 1 of embodiment 1.

FIG. 8 illustrates spectrum signals of the communication scheme A and the communication scheme B as a modification of embodiment 1 of the present invention, expressed along a frequency axis. FIG. 8 is different from FIG. 3 in that the overlapping frequency band of the communication scheme A and the communication scheme B differs. Specifically, in FIG. 3, the entire frequency band of the communication scheme A is included within the frequency band of the communication scheme B. On the other hand, as illustrated in FIG. 8, modification 1 differs from embodiment 1 in that at least a portion of the frequency band of the communication scheme A (21c in FIG. 8) is not included within the frequency band of the communication scheme B.

Here, in FIG. 8, a unit channel of the communication scheme A is defined as 20a and a unit channel of the communication scheme B is defined as 20b. A center frequency of the communication scheme A is a frequency 22a, and a center frequency of the communication scheme B is a frequency 22b. Further, a frequency band in which the two communication schemes overlap is defined as an overlapping frequency band 21a, and of the frequency bands in which the two communication schemes do not overlap, the higher frequency band is defined as a non-overlapping frequency band 21b and the lower frequency band is defined as a non-overlapping frequency band 21c.

Figure 9:
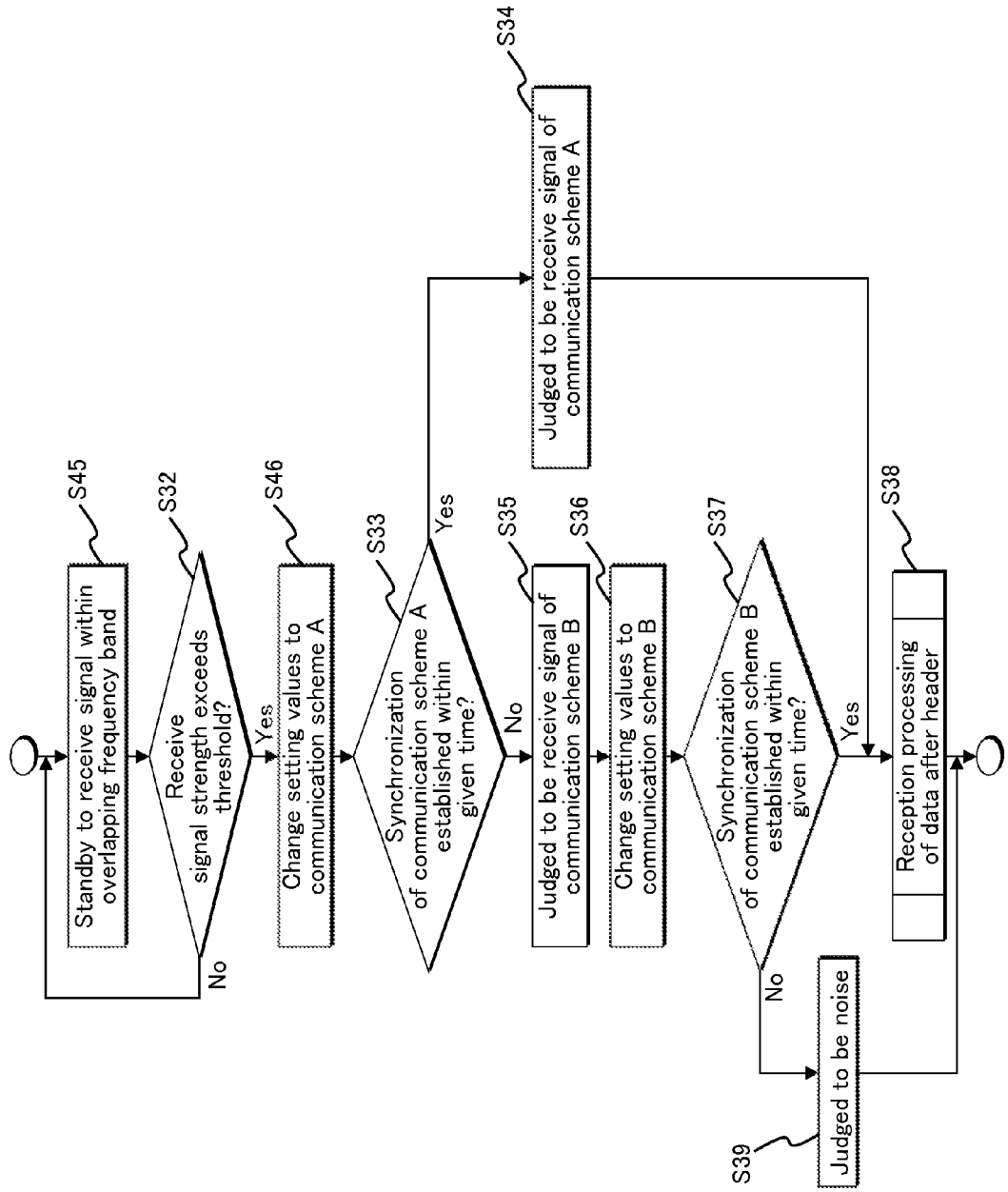
FIG. 9 is a flowchart illustrating flow of an operation in modification 1 of embodiment 1.

FIG. 9 is a flowchart illustrating a communication scheme judgment method for receive data according to a modification of embodiment 1 of the present invention. Processing that is the same as processing described with reference to FIG. 7 is assigned the same reference signs, and description thereof is omitted here.

First, the control device 1 is constantly on standby to receive a signal in a frequency range (the overlapping frequency band 21a in FIG. 8a) in which the frequency bands of the communication scheme A and the communication scheme B overlap (S45). Further, the level detection unit 25 is constantly checking whether or not a signal strength of receive data exceeds a predefined threshold (S32).

In S32, when the signal strength exceeds the predefined threshold ("Yes" at S32), the scheme judgment unit 15 sets the receiver 14 to setting values of the communication scheme A such as a bit-rate and a center frequency (the frequency 22a in FIG. 8) thereof (S46).

Next, the synchronization judgment unit 13 performs synchronization judgment based on the communication scheme A, within a given time. Specifically, the synchronization judgment unit 13 judges whether or not a bit pattern of the synchronization signal 4a is detected, based on the communication scheme A (S33).

Subsequent processing from S34 to S39 is the same as that described with reference to FIG. 7, and description thereof is omitted here.

According to the modification of embodiment 1, when only a portion of each of two spectrum signals of two communication schemes overlap, and after the control device 1 detects a beginning of receive data of an unknown communication scheme within the overlapping frequency band, based on the signal strength of the receive data, the control device 1 determines the communication scheme of the receive data by performing synchronization judgment with respect to the communication scheme A and the communication scheme B.

Note that embodiment 1 of the present invention is described as a judgment method for two communication schemes, the communication scheme A and the communication scheme B, but appropriate embodiments of the present invention are not limited in this way, and may perform judgment with respect to three or more communication schemes such as a communication scheme C, etc. In this way, the control device of the present invention may be implemented to be simultaneously on standby to receive two or more communication schemes.

Note that the synchronization signal for each communication scheme of embodiment 1 of the present invention may include a combination of a bit synchronization signal and a frame synchronization signal. In this case, the control device first performs bit synchronization judgment by using the bit synchronization signal. When bit synchronization is established, frame synchronization is performed by using the frame synchronization signal. When both bit synchronization and frame synchronization are established, the control device may judge that synchronization is established. In this way, the control device of the present invention may be implemented to be simultaneously on standby to receive multiple communication schemes, without being limited to a combination of varieties of synchronization signal or being limited to a variety of synchronization judgment methods.

Embodiment 2

According to embodiment 1, when the control device detects a beginning of receive data of an unidentified communication scheme based on a threshold value judgment of a received signal strength, the control device determines the communication scheme of the receive data by performing synchronization judgment with respect to the communication scheme A and the communication scheme B.

On the other hand, in embodiment 2, a frequency channel changing method is described in addition to a judgment method of a communication scheme of receive data.

A network configuration in embodiment 2 is the same as in FIG. 1 of embodiment 1, and description thereof is omitted here.

Figure 10:
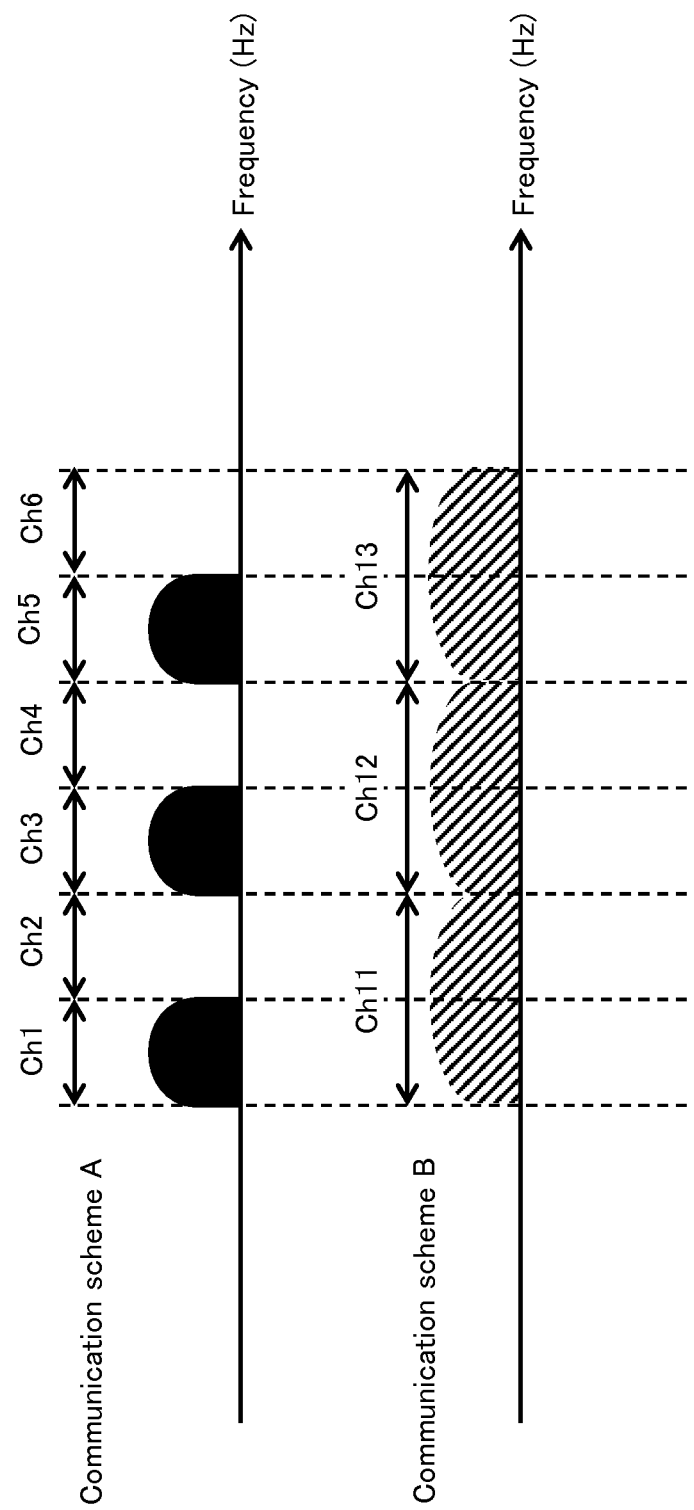
FIG. 10 is a diagram illustrating one example of frequency channels of a network system in embodiment 2.

FIG. 10 illustrates one example of frequency channels usable by a network system in embodiment 2. The communication scheme A can use Ch1, Ch3, and Ch5, and the communication scheme B can use Ch11, Ch12, and Ch13. Further, relationships between spectrum signals of all frequency channels are as illustrated in FIG. 10.

In other words, beginning values of frequencies of Ch1, Ch3, and Ch5 correspond to beginning values of frequencies of Ch11, Ch12, and Ch13, respectively.

However, it is not necessary that a beginning value of a frequency of a channel corresponding to the communication scheme A matches a beginning value of a frequency of a channel corresponding to the communication scheme B (for example, Ch1 and Ch11). Further, between corresponding channels, it is not necessary that an ending value of a frequency of the communication scheme A matches a center frequency of the communication scheme B.

Further, Ch2, Ch4, and Ch6 of the communication scheme A are empty channels. Note that allocation of frequency channels is determined in advance by an operating system.

Further, FIG. 10 illustrates an example in which the number of empty channels of the communication scheme A is one, but embodiment 2 is not limited in this way. As long as channels of the communication scheme A and the communication scheme B correspond, multiple empty channels may be provided.

Further, in such a case, the communication scheme B may also be provided with an empty channel.

Figure 11:
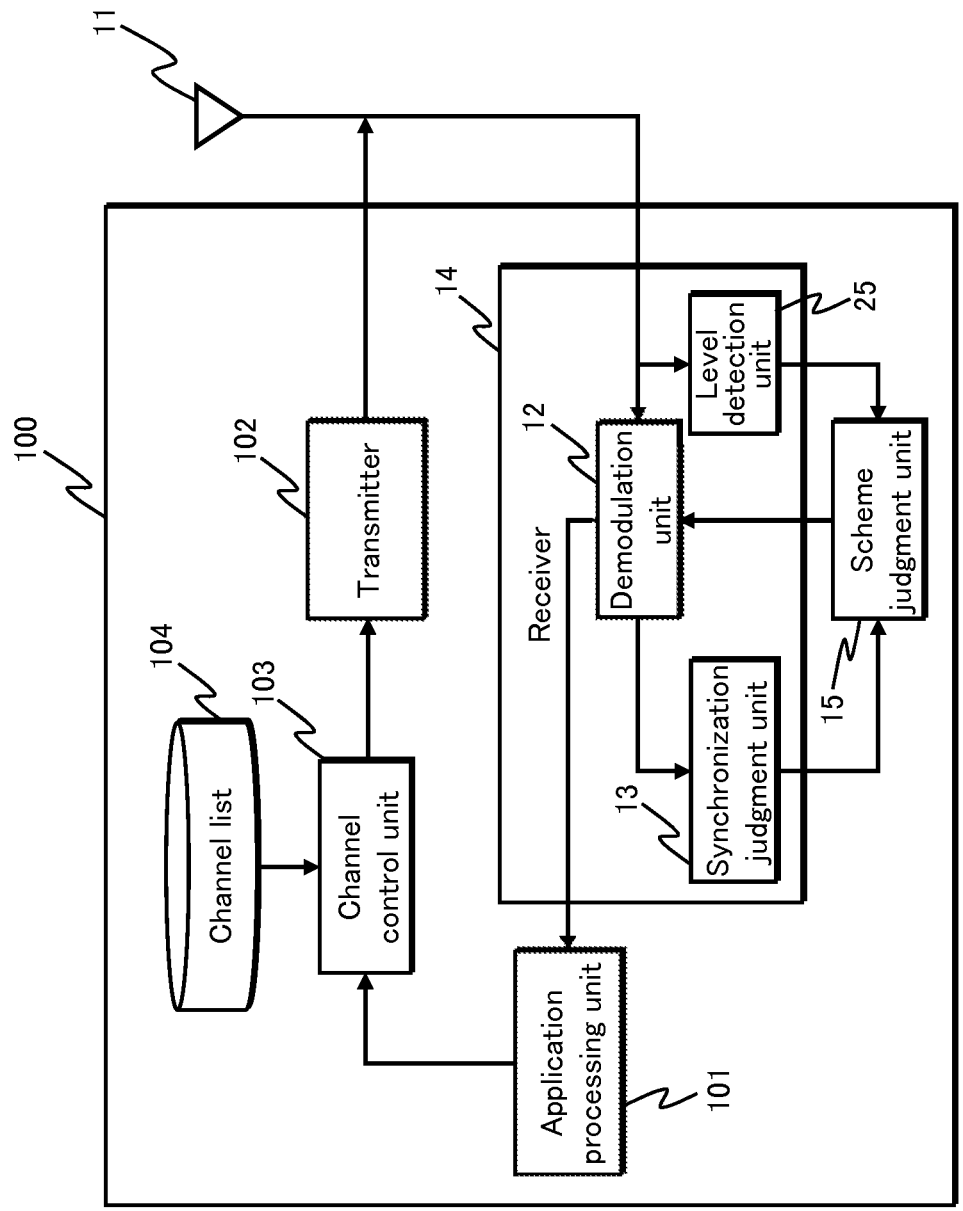
FIG. 11 is a block diagram illustrating a configuration of a control device in embodiment 2.

FIG. 11 is a diagram illustrating an example of function blocks of the control device 1 in embodiment 2 of the present invention.

Blocks that have the same functions as described with reference to FIG. 4 are assigned the same reference signs, and description thereof is omitted here.

An application processing unit 101 has a function of executing application processing of data. Application processing is processing that analyzes data content transmitted from each terminal device, for example, analysis of a media access control (MAC) header, a MAC payload, etc. Additionally, the application processing unit 101 has a function of receiving an instruction to change a frequency channel.

A transmitter 102 has a function of transmitting data and functions such as a function of modulating data to be transmitted.

A channel control unit 103 has a function of changing frequency channels in response to an instruction of the application processing unit 101. Note that detailed operations of the channel control unit 103 are provided later using the operation flowchart of FIG. 13.

A channel list 104 is a linked table that includes relationships between frequency channels of the communication scheme A and frequency channels of the communication scheme B as channel selection patterns. Note that details of the channel list 104 are described later with reference to FIG. 12.

Hardware configuration in embodiment 2 is the same as in FIG. 5 and FIG. 6 of embodiment 1, and description thereof is omitted here.

Figure 12:
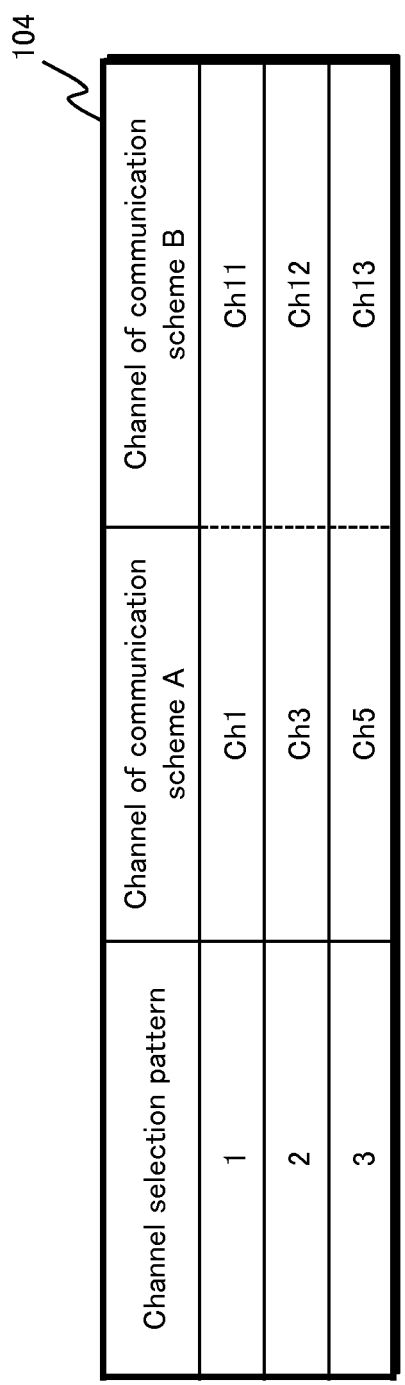
FIG. 12 is a table illustrating one example of a memory configuration of a channel list in embodiment 1.

FIG. 12 illustrates one example of a memory structure of the channel list 104 illustrated in FIG. 11. The channel list 104 stores, for each channel selection pattern, frequency channels of the communication scheme A and the communication scheme B. For example, in a channel selection pattern 1, the channel of the communication scheme A is Ch1 and the channel of the communication scheme B is Ch11.

Figure 13:
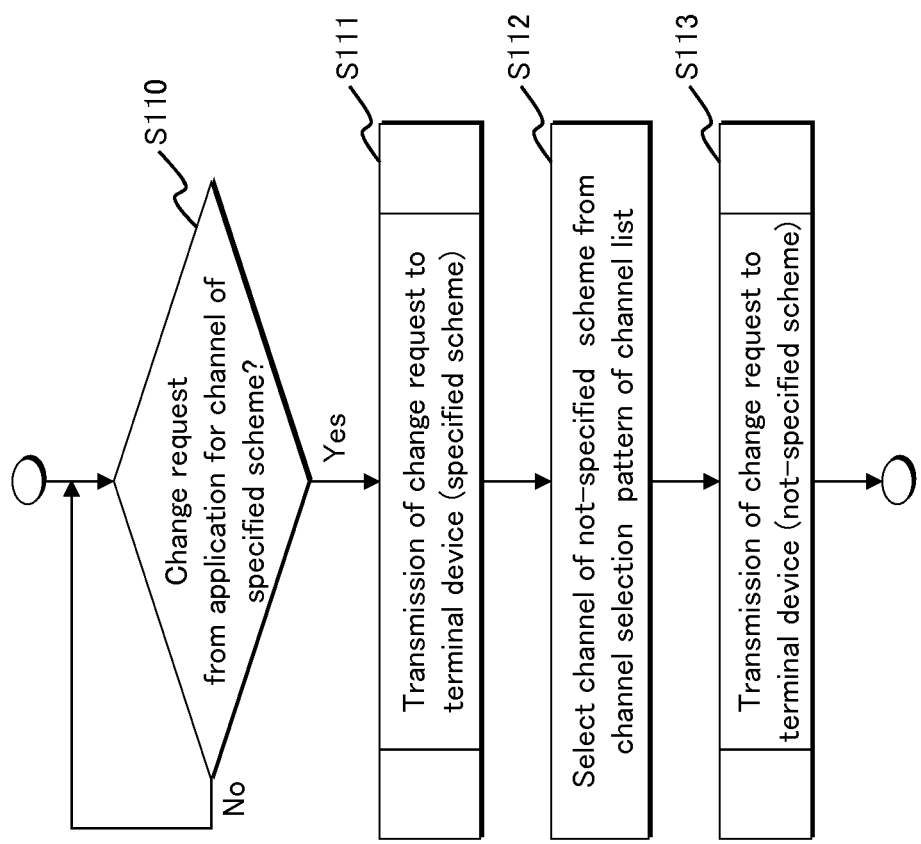
FIG. 13 is a flowchart illustrating flow of an operation in embodiment 2.

FIG. 13 is a flowchart illustrating an operation of a frequency channel change method of embodiment 2 of the present invention.

Figure 14:
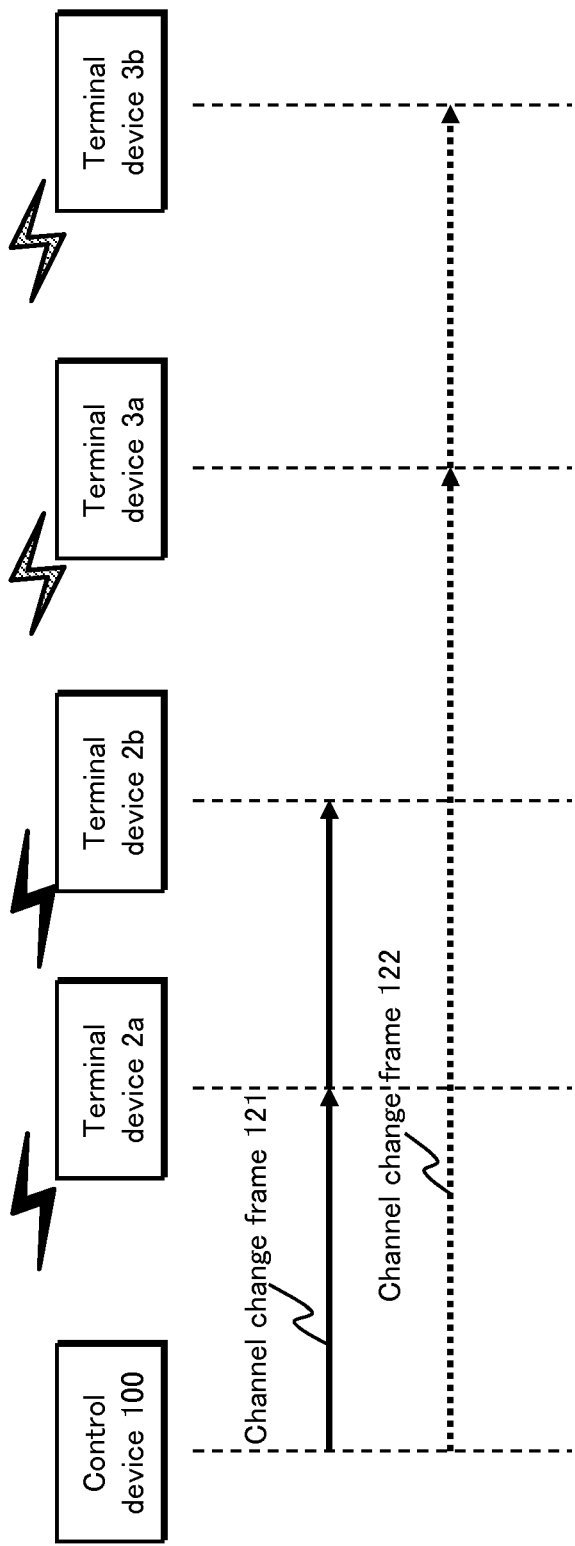
FIG. 14 is a sequence diagram illustrating an operation in embodiment 2.
Figure 15:
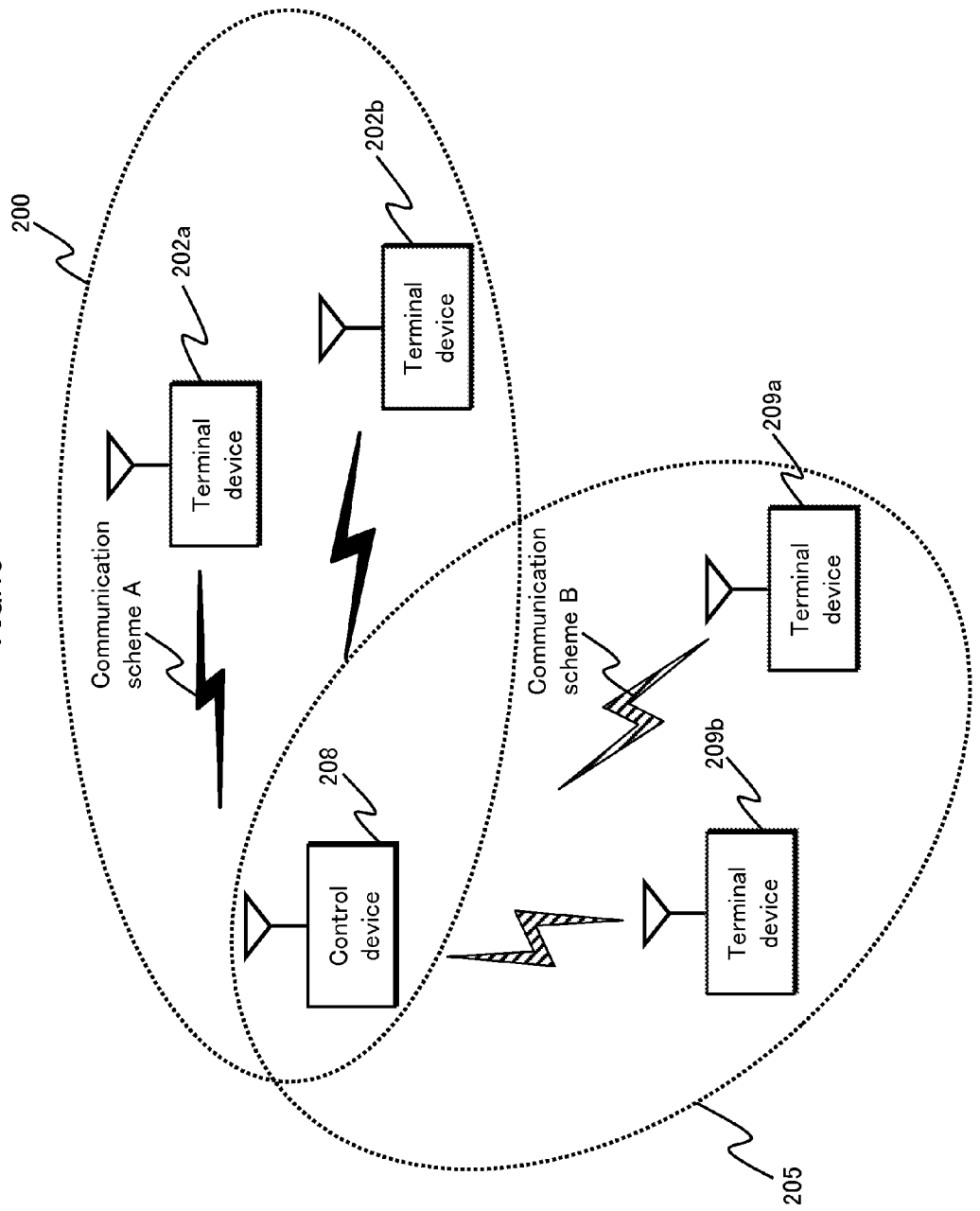
FIG. 15 is a diagram illustrating one example of a network configuration in which a plurality of communication schemes coexist.
Figure 16:
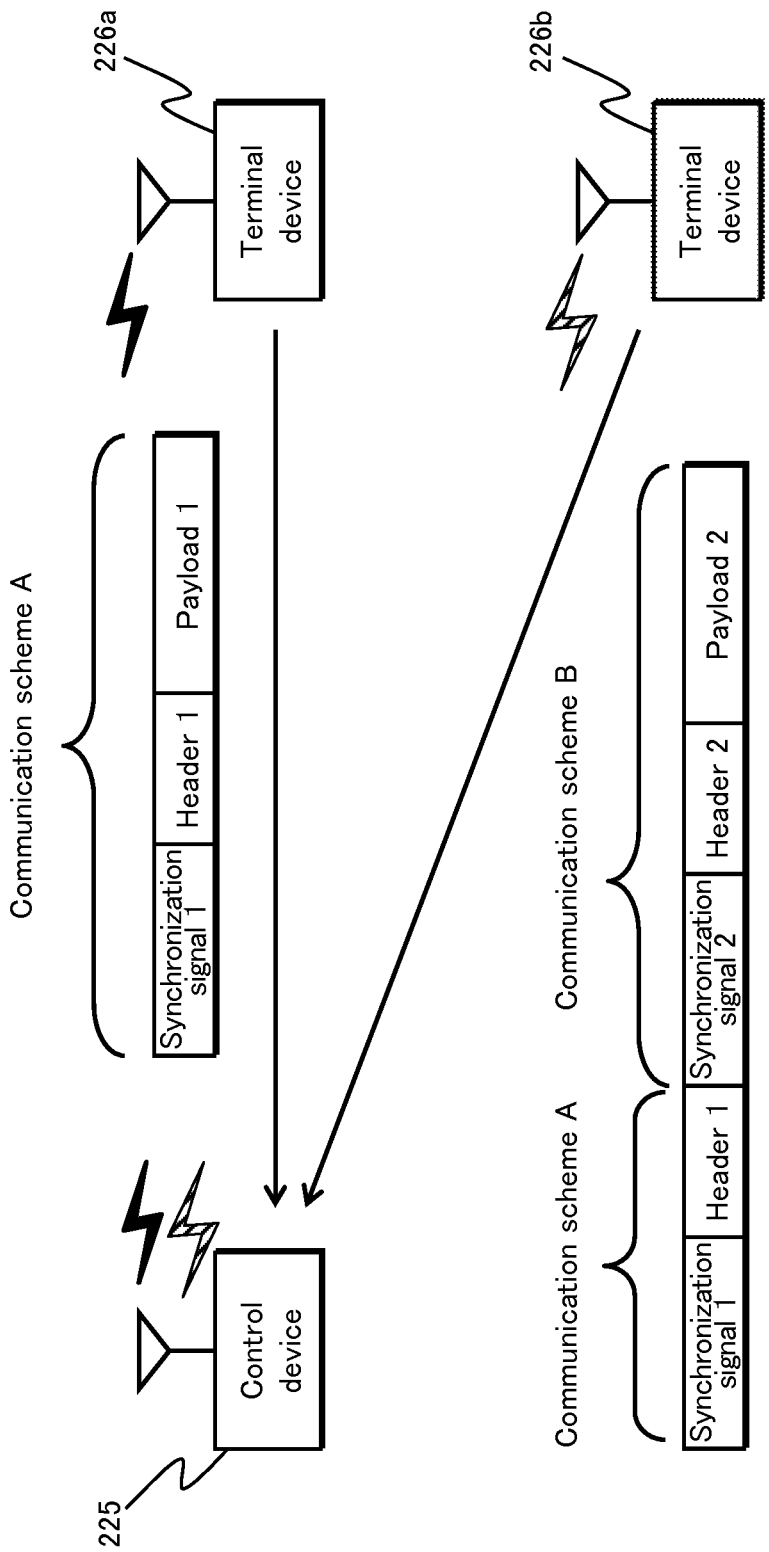
FIG. 16 is a diagram illustrating frame configurations and a network configuration in which a plurality of communication schemes coexist, as disclosed in Patent Literature 1.

FIG. 14 is a sequence chart illustrating an operation of a frequency channel change method of embodiment 2 of the present invention.

As an example of changing channels is described below in which the communication scheme A uses Ch1 and the communication scheme B uses Ch11, and both are changed to different channels.

The channel control unit 103 receives from the application processing unit 101 a channel change request for either communication scheme (S110 in FIG. 13). Here, as an example, the channel change request is a request to change the channel of the communication scheme A to Ch3.

First, the channel control unit 103 transmits, via the transmitter 102 and to the terminal devices 2a and 2b that communicate using the communication scheme A, a channel change frame for changing the channel of the communication scheme A from Ch1 to Ch3 (S111 in FIG. 13, 121 in FIG. 14). A transmission method for this transmission may be unicast transmission to the terminal device 2a and the terminal device 2b, or may be broadcast/multicast transmission.

Next, the channel control unit 103 references the channel list 104 illustrated in FIG. 12, searches for, and selects a channel selection pattern corresponding to Ch3 of the communication scheme A (S112 in FIG. 13). A channel selection pattern 2 is the result, and therefore a frequency channel that the communication scheme B is to change to is Ch12.

Next, the channel control unit 103 transmits, via the transmitter 102 and to the terminal devices 3a and 3b that communicate using the communication scheme B, a channel change frame for changing the channel of the communication scheme B from Ch11 to Ch12 (S113 in FIGS. 13 and 122 in FIG. 14). A transmission method for this transmission may be unicast transmission to the terminal device 3a and the terminal device 3b, or may be broadcast/multicast transmission.

The above describes, according to embodiment 2, how one channel corresponding to one of the communication scheme A and the communication scheme B changes in response to changing of another channel corresponding to the other one of the communication scheme A and the communication scheme B. After such a change, the one channel is changed such that at least a portion of the frequency band corresponding to the one of the communication scheme A and the communication scheme B overlaps the frequency band of the channel corresponding to the other one of the communication scheme A and the communication scheme B.

In this way, for example, when a communication error rate is high due to a noise effect in a specific frequency channel, changing to another frequency channel can avoid the noise effect. As a result, maintainability is improved during operation.

Note that communication in embodiment 1 and embodiment 2 is not limited to wireless communication, and may be wired communication via power lines (electric lighting lines), telephone lines, coaxial cables, optical cables, etc. Further, communication may be via a communication interface such as Ethernet (registered trademark), Universal Serial Bus (USB), High-Definition Multimedia Interface (HDMI) (registered trademark), IEEE 1394, etc. By such communication, the control device of the present invention is able to communicate in a variety of transmission media.

Note that processing orders of embodiment 1 and embodiment 2 may be rearranged or recombined to new configurations. For example, the operation flowchart of the control device of embodiment 2 (FIG. 13) is not limited to the processing order illustrated, and S111 may be performed after S113.

Note that although the wireless network of embodiment 1 and embodiment 2 of the present invention includes the control device and a plurality of terminal devices, direct communication between terminal devices without going through the control device is also possible. In such a case, structural functions of the control device of the present application are provided to the terminal devices, enabling the terminal devices to simultaneously standby to receive data transmitted from one terminal device to another terminal device.

Note that the configuration of embodiment 1 and embodiment 2 of the present invention may also be implemented as a program for causing execution of the program by a computer that operates via a CPU or MPU. Further, the program may also be stored on storage media such as read only memory (ROM), random access memory (RAM), etc. Alternatively, the program may be transmitted via a transmission medium such as the Internet.

Note that the configuration of embodiment 1 and embodiment 2 of the present invention is not limited to software operating via a CPU or MPU, and may typically be implemented by hardware such as a large scale integration (LSI), which is an integrated circuit. Each function may be implemented as a single chip, or all or part of the functions may be implemented on a single chip. The integrated circuit may be referred to as IC, system LSI, super LSI, ultra LSI, etc., depending on a level of integration. Further, methods of circuit integration are not limited to LSI, and implementation may be achieved by using a dedicated circuit or general-purpose processor. Furthermore, a field programmable gate array (FPGA), and/or a reconfigurable processor that allows reconfiguring of connections and settings of circuit cells within an LSI may be used. Furthermore, if circuit integration technology to replace LSI arises due to progress in semiconductor technology and other derivative technologies, such technology may of course be used to perform integration of function blocks.

The present invention is applicable to control devices for wireless networks or wired networks in which a plurality of communication schemes coexist.

REFERENCE SIGNS LIST 1, 100, 208, 225 control device
2, 3, 202a, 202b, 209a, 209b, 226 terminal device
11 antenna
12 demodulation unit
13 synchronization judgment unit
14 receiver
15 scheme judgment unit
16, 101 application processing unit
17 wireless IC
18, 19 MCU
102 transmitter
103 channel control unit
channel list

The invention claimed is:

1. A communication device that receives, via a communication network, a plurality of signals each corresponding to one of a first communication scheme and a second communication scheme, wherein
    each signal of the plurality of signals includes synchronization information corresponding to one of the first communication scheme and the second communication scheme,
    the communication device comprising:
    a non-transitory memory storing a program; and
    a hardware processor that executes the program and causes the communication device to operate as:
    a receiver configured to receive the plurality of signals via a frequency band within which at least a portion of a frequency band of a channel corresponding to the first communication scheme overlaps with at least a portion of a frequency band of a channel corresponding to the second communication scheme;
    a synchronization judgment unit that detects the synchronization information included in the signal received by the receiver; and
    a scheme judgment unit that, when synchronization information corresponding to the first communication scheme is detected in the signal received by the receiver, performs reception processing of the signal using the first communication scheme, and when synchronization information corresponding to the first communication scheme is not detected and synchronization information corresponding to the second communication scheme is detected in the signal received by the receiver, performs reception processing of the signal using the second communication scheme.

2. The communication device of claim 1, wherein,
    when the frequency band of the channel corresponding to the first communication scheme is included within the frequency band of the channel corresponding to the second communication scheme,
    the synchronization judgment unit, after attempting to detect synchronization information corresponding to the first communication scheme and when synchronization information corresponding to the first communication scheme is not detected, attempts to detect synchronization information corresponding to the second communication scheme.

3. The communication device of claim 1, wherein
    the synchronization judgment unit detects the synchronization information by using a center frequency corresponding to the first communication scheme and a center frequency corresponding to the second communication scheme.

4. The communication device of claim 1, wherein
    each signal to be received by the receiver further includes a data payload, and
    the scheme judgment unit, when synchronization of the signal to be received is established at a frequency corresponding to one of the first communication scheme and the second communication scheme, performs reception processing of the data payload included in the signal.

5. The communication device of claim 1, wherein
    the scheme judgment unit, when synchronization of the signal is not established at a center frequency corresponding to the second communication scheme, ceases reception processing of the signal.

6. The communication device of claim 1, wherein
    the synchronization information includes bit synchronization information and frame synchronization information, and
    the synchronization judgment unit performs bit synchronization judgment using the bit synchronization information and subsequently performs frame synchronization judgment using the frame synchronization information, and, when both bit synchronization and frame synchronization are established, judges that synchronization of the signal is established.

7. The communication device of claim 1, further comprising:
a channel control unit that, in response to a change in a channel corresponding to the first communication scheme, changes a channel corresponding to the second communication scheme, and changes frequency bands of the channels corresponding to the first communication scheme and the second communication scheme after the change such that at least a portion of the frequency band of the channel corresponding to the first communication scheme overlaps with at least a portion of the frequency band of the channel corresponding to the second communication scheme.

8. The communication device of claim 7, further comprising:
a channel list storage unit that stores a channel list of combinations of channels of each communication scheme such that at least a portion of the frequency band of the channel corresponding to the first communication scheme overlaps with at least a portion of the frequency band of the channel corresponding to the second communication scheme, wherein
the channel control unit changes the channel by referencing the channel list storage unit.

9. The communication device of claim 1, wherein
a transmission bandwidth of the second communication scheme is an integer multiple of a transmission bandwidth of the first communication scheme.

10. The communication device of claim 9, wherein
the transmission bandwidth of the first communication scheme is 200 kHz and the transmission bandwidth of the second communication scheme is 400 kHz.

11. The communication device of claim 1, wherein
the communication network is a wireless communication network.

12. A signal reception method of a communication device that receives, via a communication network, a plurality of signals corresponding to different communication schemes, wherein
each signal of the plurality of signals includes synchronization information corresponding to one of the different communication schemes,
the signal reception method comprising:
receiving the plurality of signals via a frequency band within which at least a portion of a frequency band of a channel corresponding to a first communication scheme overlaps with at least a portion of a frequency band of a channel corresponding to a second communication scheme;
detecting the synchronization information included in a signal received by the receiver; and
when synchronization of one communication information corresponding to the first communication scheme is detected in the signal received, performing reception processing of the signal using the first communication scheme, and when synchronization information corresponding to the first communication scheme is not detected and synchronization information corresponding to the second communication scheme is detected in the signal received, performing reception processing of the signal using the second communication scheme.

13. An integrated circuit mounted on a communication device that receives, via a communication network, a plurality of signals each corresponding to one of a first communication scheme and a second communication scheme, wherein
each signal of the plurality of signals includes synchronization information corresponding to one of the first communication scheme and the second communication scheme,
the integrated circuit comprising:
a non-transitory memory storing a program; and
a hardware processor that executes the program and causes the integrated circuit to operate as:
a receiver configured to receive the plurality of signals via a frequency band within which at least a portion of a frequency band of a channel corresponding to the first communication scheme overlaps with at least a portion of a frequency band of a channel corresponding to the second communication scheme;
a synchronization judgment unit that detects the synchronization information included in the signal received by the receiver; and
a scheme judgment unit that, when synchronization information corresponding to the first communication scheme is detected in the signal received by the receiver, performs reception processing of the signal using the first communication scheme, and when synchronization information corresponding to the first communication scheme is not detected and synchronization information corresponding to the second communication scheme is detected in the signal received by the receiver, performs reception processing of the signal using the second communication scheme.

14. A non-transitory computer-readable recording medium storing a program that causes a computer to execute a signal reception method of a communication device that receives, via a communication network, a plurality of signals corresponding to different communication schemes, wherein
each signal of the plurality of signals includes synchronization information corresponding to one of the different communication schemes,
the signal reception processing method comprising:
receiving the plurality of signals via a frequency band within which at least a portion of a frequency band of a channel corresponding to a first communication scheme overlaps with at least a portion of a frequency band of a channel corresponding to a second communication scheme;
detecting the synchronization information included in a signal received by the receiver; and
when synchronization of one communication information corresponding to the first communication scheme is detected in the signal received, performing reception processing of the signal using the first communication scheme, and when synchronization information corresponding to the first communication scheme is not detected and synchronization information corresponding to the second communication scheme is detected in the signal received, performing reception processing of the signal using the second communication scheme.

* * * * *